UNITED STATES PATENT OFFICE.

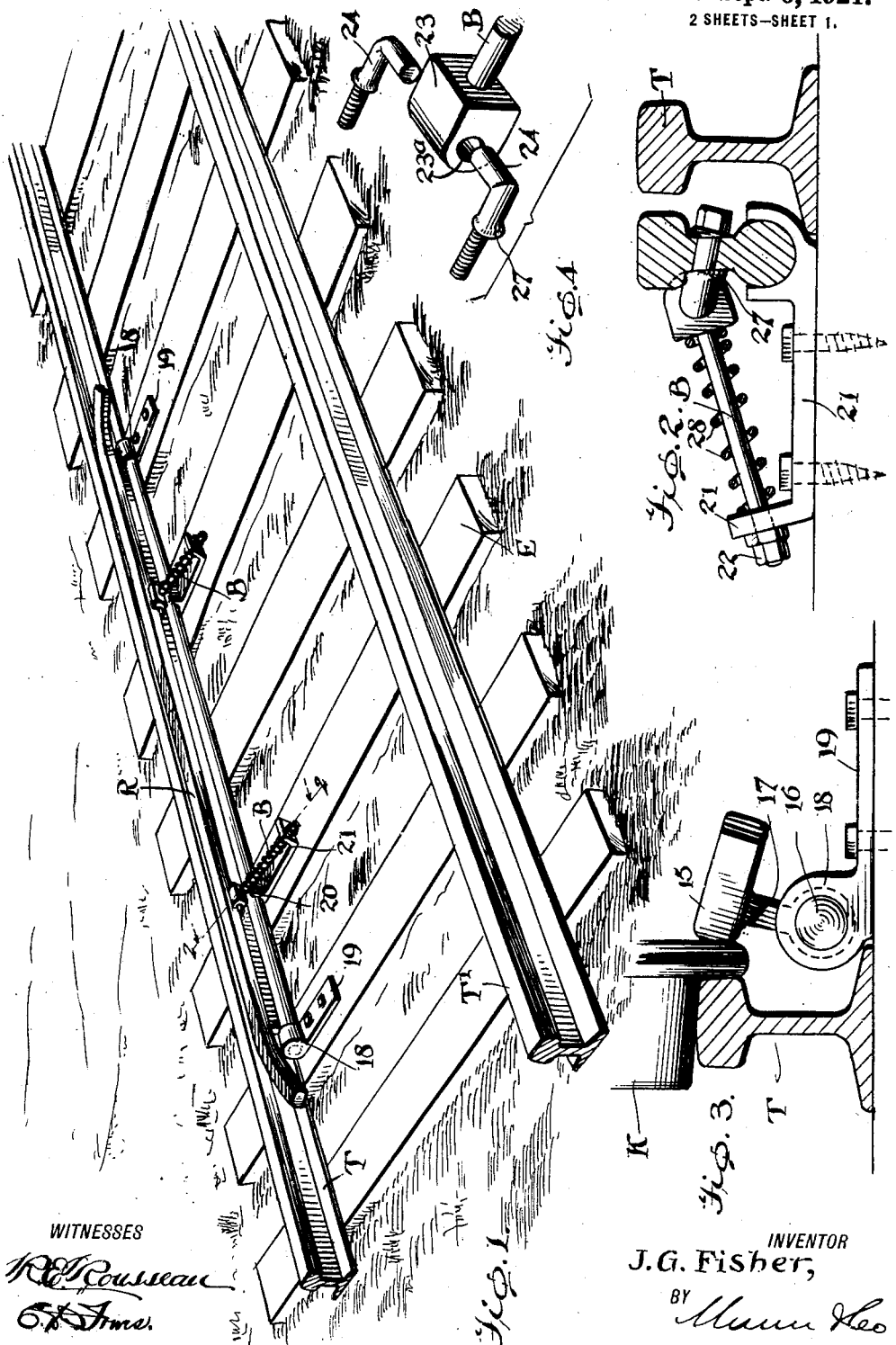

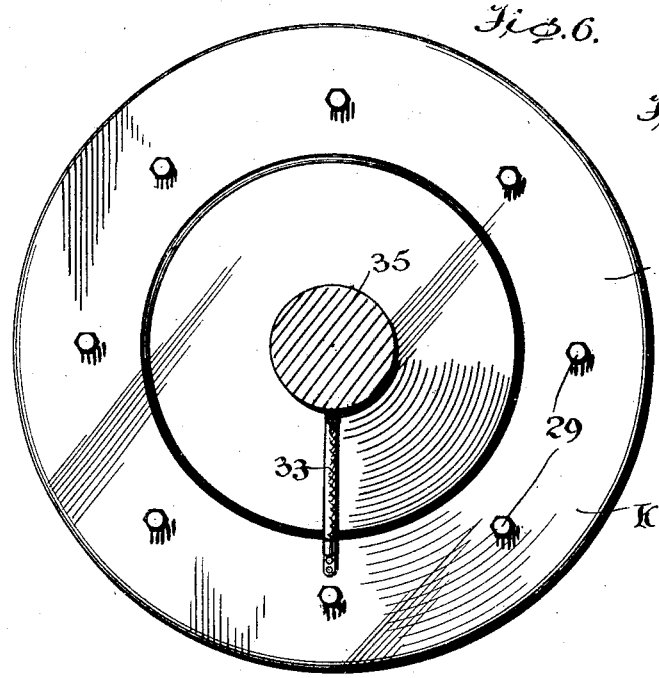
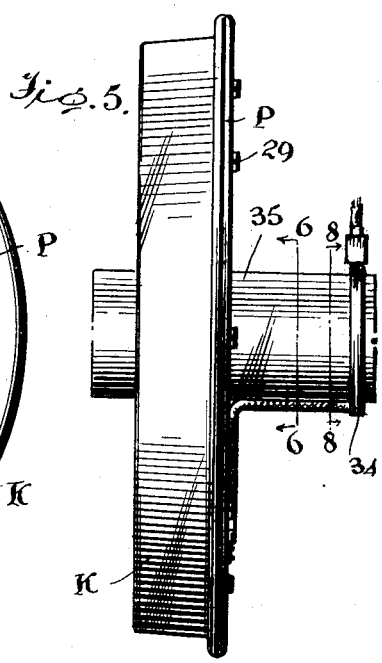
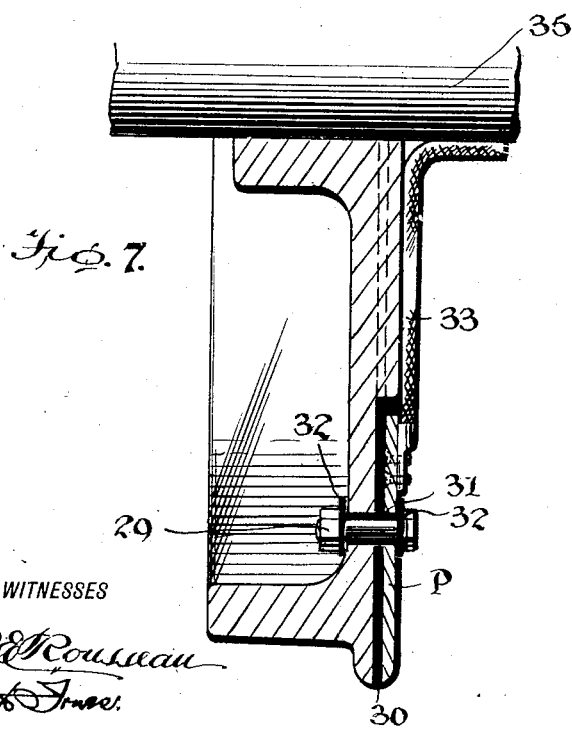
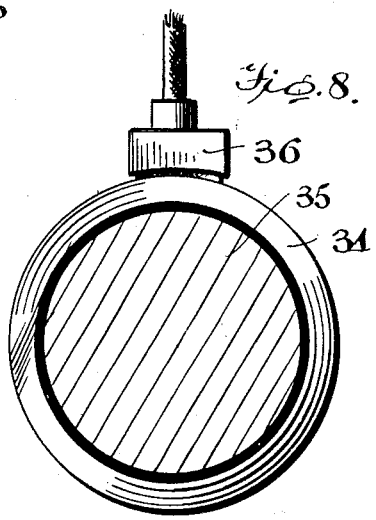

JOHN G. FISHER, OF FAIRFAX COUNTY, VIRGINIA, ASSIGNOR OF ONE-HALF TO FRANK M. FISHER, OF PADUCAH, KENTUCKY.

CIRCUIT-CONTROLLER FOR TRAIN-CONTROL APPARATUS.

1,389,748.   Specification of Letters Patent.   Patented Sept. 6, 1921.

Application filed May 27, 1921. Serial No. 473,068.

*To all whom it may concern:*

Be it known that I, JOHN G. FISHER, a citizen of the United States, and a resident of Fairfax county and State of Virginia, have invented certain new and useful Improvements in Circuit-Controllers for Train-Control Apparatus, of which the following is a specification.

My invention relates to train control apparatus and particularly to circuit controllers therefor designed to effect the completion of a circuit including a track and car carried apparatus for controlling the movement of the train, to set such apparatus into operation.

A purpose of my invention is the provision of a circuit controller which includes one or more wheels of a car having an entire wheel or a portion thereof insulated from its axle, and a contact rail associated with one track rail so as to provide a restricted channel or passageway through which the wheel flange is adapted to move, the contact rail being yieldingly urged toward the track rail when the flange enters the channel, thus causing the flange to have a rotating contact with the contact rails and thereby effecting the removal of foreign matter such as snow or ice from the contacting surfaces of the two to insure a good electrical contact between the same. My invention is designed for use in a train control system in which the inner flange constitutes one terminal of the car carried portion of the circuit, and the contact rail one terminal of the track carried portion of the circuit, so that by providing a good electrical contact between the two, the completion of the circuit is insured to set the train control apparatus into operation.

I will describe one form of circuit control embodying my invention, and will then point out the novel features thereof in claims.

In the accompanying drawings:

Figure 1 is a view showing in perspective a portion of a railway track having applied thereto one form of contact rail comprised in the circuit controller embodying my invention.

Fig. 2 is a transverse sectional view taken on the line 2—2 of Fig. 1 and looking in the direction of the arrows.

Fig. 3 is a view showing the contact rail in end elevation at the side of the track rail and with a car wheel flange interposed between the contact rail and the track rail.

Fig. 4 is a detailed perspective view of one of the securing yokes and bolt head for the contact rail.

Fig. 5 is a view showing in side elevation one form of a car wheel comprised in the circuit controller embodying my invention.

Fig. 6 is a vertical sectional view taken on the line 6—6 of Fig. 5 and looking in the direction of the arrows.

Fig. 7 is a vertical sectional view of the wheel shown in Fig. 6.

Fig. 8 is a vertical sectional view taken on the line 8—8 of Fig. 5.

Similar reference characters refer to similar parts in each of the several views.

Referring specifically to the drawings and particularly to Fig. 1, T and T' designate the two rails of a track, and E the jaws, the contact rail R being arranged between the track rails and in close proximity to the rail T. The contact rail R is formed of suitable metal and includes a head 15 similar in shape to a rail head, a base 16 of circular formation in cross section, and a web 17 connecting the base and the head. As shown in Fig. 1, the opposite ends of the head 15 are extended beyond the web 17 and base 16 and are curved inwardly from the track rail T to provide tapered entrances to the channel passageway formed between the heads of the contact rail and track rail. The opposite ends of the base 16 are extended beyond the web 17 and are here journaled in bearings 18 formed on the ends of plates 19 bolted to certain of the jaws E. Intermediate its ends, the base 16 is also supported for rotation by means of semicircular bearings 20 formed on the ends of brackets 21 secured to the jaws E. By this arrangement it will be seen that the contact rail as a unit is capable of lateral swinging movement toward or away from the track rail T.

For the purpose of urging the contact rail to a predetermined position with respect to the track rail, I provide a pair of bolts B extending through the upturned end 21ª of the brackets 21 and provided with nuts 22 for limiting the movement of the bolts in one direction. The bolts are provided with heads 23 formed with an opening 23ª in which rotatably fits a pair of L-shaped members 24 constituting a yoke. The members 24 extend through suitable openings formed in the web 17 of the contact rail where they are secured by nuts 25 engaging the threaded ends of the members. Tapered washers 26 are interposed between the nuts 25 and the web of the rail to form a flat bearing surface for the nuts, it being particularly noted that as shown in Fig. 2 the members extend through the web of the rail at an acute angle. Shoulders 27 are also formed on the members 26 for limiting the inward movement of the members through the rail and to coact with the nuts in immovably retaining the yokes within the rail. Coiled expansible springs 28 surround the shanks of the bolts B and are interposed between the upturned ends 21$^a$ and the heads 23, such springs serving to urge the contact rail as a unit to a predetermined position with respect to the track rail T.

Referring now to Figs. 5 to 8 inclusive, I have here shown one form of car wheel embodying my invention and adapted for use in conjunction with the contact rail R. The car wheel is designated generally at K and is of the standard construction with the exception that the flange and a portion of the wheel body is split to form an annular plate P secured to the wheel by means of bolts 29 and electrically insulated from the wheel through the medium of an annular insulating plate 30 interposed between the plate P and the wheel, sleeves 31 embracing the shanks of the bolts and washers 32 between the heads and nuts of the bolt. A wire 33 electrically connects the plate P to a collector ring 34 mounted on and insulated from the wheel axle 35. A brush 36 constantly contacts with the collector ring 34 for delivering current to or removing the same from the collector ring.

In practice, the contact rail R is preferably of such a length that only one wheel of a car engages the contact rail at one time, the springs 28 serving to urge the contact rail to such a position with respect to the track rail T that when a car wheel traverses the track rail T, this flange will engage and move the contact rail inwardly from the track rail or from the position shown in Fig. 2 to that shown in Fig. 3.

In operation, a car or locomotive is provided with one or more wheels K, and where more than one wheel is provided all of such wheels will traverse the track rail T. As the car moves over the track the flange of the wheel K passes into the channel between the rails R and T and because of the position of the contact rail, the wheel flange effects the spreading of the contact rail against the tension of the springs 28 so that the rail now occupies the position shown in Fig. 3. In this position of the rail the plate P is in rotating contact with such rail so that should the contact rail be covered with foreign matter such as snow or ice the movement of the wheel flange against the rail creates an abrasive action which insures the removal of the foreign matter from the contact surface of the rail and thereby provides a good electrical contact between the plate P and the contact rail. Current supplied to the contact rail is thus conveyed to the plate P and from the latter to the collector ring 34 where it may be delivered to the cab of the car or locomotive where it may actuate the apparatus for controlling the movement of the car over the track. As soon as the wheel passes between the contact rail and the track rail, the springs 28 serve to return the contact rail to its normal position for operation by subsequent cars.

Although I have herein shown and described only one form of circuit controller embodying my invention, it is to be understood that various changes and modifications may be made herein without departing from the spirit of the invention or the spirit and scope of the appended claims.

What I claim is:

1. A circuit controller comprising a wheel adapted to be insulated from a car, and a contact rail supported for movement and yieldingly urged to a predetermined position, said rail being adapted to normally occupy such a spaced position with respect to a track rail so as to be engaged and held in contact with the flange of said wheel during movement of the latter over the track rail whereby the flange is caused to have rotating contact with the contact rail to provide a good electrical contact between the two and to remove foreign matter from the contact surfaces of the two.

2. A circuit controller comprising a wheel adapted to be insulated from a car, a contact rail adapted to be arranged in spaced parallel relation to the inner side of a track rail, means for supporting the contact rail for lateral movement toward or away from a track rail, means for urging the contact rail to a spaced position with respect to the track rail so as to be engaged and held in contact with the flange of said wheel during movement of the latter over the track rail for the purpose described.

3. A circuit controller comprising a wheel having a portion of the flange thereof insulated from the remainder of the wheel, a contact rail, means for supporting the contact rail for lateral swinging movement, and springs engageable with the contact rail for urging the same to a definite position.

4. In a circuit controller of the character described, a contact rail including a base of circular cross section, bearing plates engageable with said base for supporting the rail for lateral swinging movement, bolts connected to certain of the bearing plates and to said rail, and springs embracing the bolts and urging the rail to a definite position.

5. In a circuit controller of the character described, a contact rail including a head having the opposite ends thereof extending beyond the web of the rail and curved laterally therefrom, a base of circular cross section having its end portions extended beyond the web, bearing plates rotatably receiving the base to allow of lateral swinging movement of the rail, bolts having a pivotal connection with said rail and slidable through certain of said plates, and springs surrounding the bolts and arranged to urge the rail to a definite position.

6. In a circuit controller of the character described, a contact rail including a head having the opposite ends thereof extending beyond the web of the rail and curved laterally, a base of circular cross section having its end portions extended beyond the web, bearing plates rotatably receiving the base to allow of lateral swinging movement of the rail, bolts slidably fitted in certain of said plates, heads formed on the bolts, sectional yokes movably engaging the heads and secured to said rail, nuts engaging the bolts for defining the movement thereof in one direction, and springs interposed between said plates and heads and surrounding said bolts to urge the latter and said rail to a definite position.

7. A circuit controller of the character described comprising a wheel having a split flange and body portion secured to and insulated from the wheel, a contact rail including a head having laterally curved extremities, and a base of circular cross section, bearing plates for rotatably supporting the base, bolts slidably fitted in certain of said plates, heads formed on the bolts, sectional yokes movably engaging the heads and secured to said rail, nuts engaging the bolts for defining the movement thereof in one direction, and springs interposed between said plates and heads and surrounding said bolts to urge the latter and said rail to a definite position.

8. A circuit controller comprising a contact wheel, a rockable rail, and means urging the rail toward the contact wheel to produce a scraping contact as the wheel passes.

JOHN G. FISHER.